United States Patent
Bothwell et al.

(10) Patent No.: US 7,567,760 B2
(45) Date of Patent: Jul. 28, 2009

(54) METHOD AND APPARATUS FOR PROVIDING DIAGNOSTIC FEATURES FOR AN OPTICAL TRANSCEIVER

(75) Inventors: Andrew Bothwell, Ipswich (GB); Richard Cronin, Ipswich (GB); David Healy, Stowmarket (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 460 days.

(21) Appl. No.: 11/477,220

(22) Filed: Jun. 29, 2006

(65) Prior Publication Data

US 2007/0009260 A1    Jan. 11, 2007

(30) Foreign Application Priority Data

Jul. 7, 2005    (GB) .................................. 0513895.3

(51) Int. Cl.
*H04B 10/06* (2006.01)

(52) U.S. Cl. .................. 398/202; 398/158; 398/159; 398/135; 398/136; 398/208; 385/89; 385/90; 385/92; 385/93

(58) Field of Classification Search ................ 398/147, 398/158, 159, 81, 202, 208, 209, 214, 33, 398/177, 164, 135, 136, 137; 385/24, 89, 385/90, 92, 93
See application file for complete search history.

(56) References Cited

U.S. PATENT DOCUMENTS

| 7,373,087 B2 * | 5/2008 | Shi et al. ..................... 398/147 |
| 2003/0016605 A1 | 1/2003 | Tateyama et al. ........ 369/47.26 |
| 2003/0112496 A1 | 6/2003 | Van Schyndel .......... 359/337.5 |
| 2003/0115006 A1 | 6/2003 | Schyndel ..................... 702/85 |
| 2006/0067699 A1 * | 3/2006 | Chandrasekhar et al. .... 398/147 |
| 2006/0093379 A1 * | 5/2006 | Aronson ..................... 398/208 |

FOREIGN PATENT DOCUMENTS

| EP | 0863626 | 9/1998 |
| EP | 1237307 | 4/2002 |
| WO | WO 2004/032386 | 4/2004 |
| WO | WO 2004/077111 | 9/2004 |

* cited by examiner

*Primary Examiner*—Hanh Phan (57) ABSTRACT

A method and apparatus for providing diagnostic features for an optical transceiver, in which the optical transceiver uses electronic dispersion compensation (EDC) in order to alleviate distortion of a signal caused by dispersion. A method and apparatus for monitoring the performance of an electronic dispersion compensator by monitoring one or more signals from the electronic dispersion compensator and generating an alarm in the vent that the performance of the electronic dispersion compensator falls below a certain threshold.

4 Claims, 6 Drawing Sheets

METHOD AND APPARATUS FOR PROVIDING DIAGNOSTIC FEATURES FOR AN OPTICAL TRANSCEIVER

BACKGROUND a. Field of the Invention

This invention relates to a method and apparatus for providing diagnostic features for an optical transceiver, in which the optical transceiver uses electronic dispersion compensation (EDC) in order to alleviate distortion of a signal caused by dispersion.

As data rates and link lengths increase in modern communications channels the impact of signal distortion effects, such as dispersion, become more apparent. These can prevent transmission at high data rates over long lengths of fibres.

In a multimode optical fibre different modes have different propagation velocities, which tends to disperse a pulse into adjacent pulses, thereby causing inter symbol interference (ISI). Pulse dispersion also occurs in single mode fibre, but to a lesser extent. Such effects will therefore tend to close an eye pattern and increase the measured bit error rate (BER) at the receiver.

High-speed optical communications links, for example links operating at a data rate of at least 5 Gbit/s, have tended to use single mode optical fibre together with high precision optical fibre connectors. This has been the case even when such links are operating over short distances in local area networks where links are typically of the order of 10 m to 100 m in length. While such high speed communications links provide reliable performance at a very low BER, for example 10-12, there is a need for comparable performance at greatly reduced cost, and in practice this requires the use of multi-mode transmission and cheaper connectors, and preferably also cheaper and potentially less stable sources of optical radiation.

For multi mode fibre the effect of dispersion is reduced in the electronic domain (i.e., after the photodetector) by schemes, which are called electronic dispersion compensation (EDC).

For data rates of 10 Gb/s using multimode fibre without electronic dispersion compensation permits transmission up to ~80 m (with a 1310 nm laser source). Local area networks have a large installed fibre base with link lengths up to ~300 m which have been used at lower data rate. It is desirable to avoid the cost of replacing these with single mode fibre to increase the possible data rate. Therefore an optical transceiver that will work over this installed fibre base is required.

Such compensators can use an equaliser circuit to compensate for intersymbol interference caused by dispersion. Such an equaliser circuit receives as an input the output from a photoreceiver including a photodetector circuit, and then generates from this at least two equaliser coefficients. A signal delay line also receives the output from the photodetector circuit. Tapped outputs from the delay line are each multiplied or otherwise combined with one of the equaliser coefficients, and then summed together to generate an equalised output signal.

Provided that the coefficients are carefully optimised, the signal quality can be significantly improved. For a given transmitter and fibre, electronic dispersion compensation can increase the achieved transmission distances by e.g. 50%. The invention proposed herein seeks to further increase the improvement up to a factor of 2.5.

A technical challenge of great importance for applications is automatic adaptation of the parameters of the electronic dispersion compensator to the link properties, because the optimum parameters depend on the properties of the fibre link and the transmitter, and manual optimization is not cost-effective. Particularly in systems with multi-mode fibres, the optimum parameters may also drift with time.

One common approach is to use a least mean squared (LMS) algorithm to generate the equaliser coefficients. Such equalisers use an iterative approach that aims to converge on the correct equaliser coefficients slowly over many hundreds or thousands of repeat calculations. Although, it may be possible to achieve higher performance at increased cost and complexity in the equaliser.

Electronic Dispersion Compensation can be used to allow 10 Gb/s serial transmission over 220 to 300 m of Fibre Distributed Data Interface (FDDI) grade multimode fibre.

In this application there can be large variation in different fibres' channel characteristics. In some rare cases channel characteristics could be so bad that EDC may not be able to correct for the signal impairments caused by a particular fibre.

An additional complexity is the temporal variability in a fibre's characteristics. Potentially over time a fibre's characteristics could drift in and out of a state that could or could not be corrected for by EDC. This could result in a system that works when installed but where over time a link failure will occur.

This invention offers a simple method of diagnosing whether a fibre used in a link is likely to be corrected by the EDC, hence, giving an early indication of the likelihood of a link failure. This allows a system installer to avoid use of such fibres. The invention provides a dynamic indication of performance over a fibre, thus giving an indication of variation of the performance over time.

The IEEE standard (802.3aq 10GBASE-LRM) for a 10 Gb/s multimode fibre application permits two launches. An offset launch or a centre launch can be used. The intent of this is to widen fibre coverage as for many fibres dispersion can be bad at centre launch but good at offset launch or vice versa. The method of this invention seeks to provide a simple way of determining which launch may be best to use.

SUMMARY OF THE INVENTION

According to one aspect the invention there is provided a method of monitoring the performance of an electronic dispersion compensator which receives an optical signal and generates an equalised signal, in which the electronic dispersion compensator includes an equalisation coefficient generator, the method comprising the steps of: receiving a signal from the equalisation coefficient generator; and generating an alarm in dependence upon said signal.

In one embodiment of the invention the equalisation coefficient generator is arranged in operation to perform the steps of converting the equalised signal to a digital signal; comparing said digital signal to said analogue signal to provide an error signal; wherein the signal received from the equalisation coefficient generator is said error signal; and in which the generating step comprises the sub-steps of comparing said error signal to a predetermined threshold; and generating the alarm in the event that the error signal exceeds the predetermined threshold.

In another embodiment of the invention the equaliser is arranged in operation to perform the steps of converting the equalised signal to a digital signal; comparing said digital signal to said analogue signal to provide an error signal; wherein the signal received from the equalisation coefficient generator is said digital signal; and in which the generating step comprises the sub-steps of sampling the output signal using a plurality of voltage thresholds wherein said sampling of the output signal uses a clock utilising a plurality of phase delays; determining the bit error rate for a plurality of combinations of voltage threshold and phase delay; determining an eye opening voltage at which the bit error rate exceeds a predetermined bit error threshold; determining an eye opening phase delay at which the bit error rate exceeds a predetermined bit error threshold; generating the alarm when either the eye opening voltage less than a voltage predetermined threshold; or the eye opening phase delay is less than a phase delay predetermined threshold.

In a third embodiment of the invention the equaliser is arranged in operation to generate a plurality of tap weights for use in weighting delayed portions of a received signal prior to summing said delayed portions to provide said equalised signal and in which the generating step comprises the sub-steps of: estimating an impulse response in dependence upon a combination of the equaliser tap weights; and generating the alarm in dependence upon said estimated impulse response.

According to another aspect of the invention there is provided an apparatus for monitoring the performance of an electronic dispersion compensator which receives an optical signal and generates an equalised signal, in which the electronic dispersion compensator includes an equalisation coefficient generator, the apparatus comprising a signal distortion analyser arranged in operation to receive a signal from the equalisation coefficient generator and generate an alarm in dependence upon said signal.

In one embodiment the equalisation coefficient generator comprises: a converter for converting the equalised signal to a digital signal; a comparator to compare said digital signal to said equalised signal to provide an error signal; and in which the signal distortion analyser comprises: a comparator for comparing said error signal to a predetermined threshold; and means for generating the alarm in the event that the error signal exceeds the predetermined threshold.

In another embodiment the equalisation coefficient generator comprises: a converter for converting the equalised signal to a digital signal; a comparator to compare said digital signal to said equalised signal to provide an error signal; and in which the signal distortion analyser comprises: a decision circuit arranged in operation to sample the digital signal using a plurality of voltage thresholds and to sample the digital signal using a clock utilising a plurality of phase delays; a bit error determiner arranged in operation to determine the bit error rate for a plurality of combinations of voltage threshold and phase delay; an eye opening determiner arranged in operation to determine an eye opening voltage at which the bit error rate exceeds a predetermined bit error threshold and to determine an eye opening phase delay at which the bit error rate exceeds a predetermined bit error threshold; and an alarm generator arranged in operation to generate an alarm when either the eye opening voltage less than a voltage predetermined threshold; or the eye opening phase delay is less than a phase delay predetermined threshold.

In yet another embodiment of the invention the equalisation coefficient generator is arranged in operation to generate a plurality of tap weights for use in weighting delayed portions of a received signal prior to summing said delayed portions to provide said equalised signal and in which the and in which the signal distortion analyser comprises: means for estimating an impulse response in dependence upon a combination of the equaliser tap weights; and means for generating the alarm in dependence upon said estimated impulse response.

BRIEF DESCRIPTION OF THE DRAWINGS

Embodiments of the invention will now be described, by way of example only, with reference to the accompanying drawings, in which.

DETAILED DESCRIPTION

Figure 1:
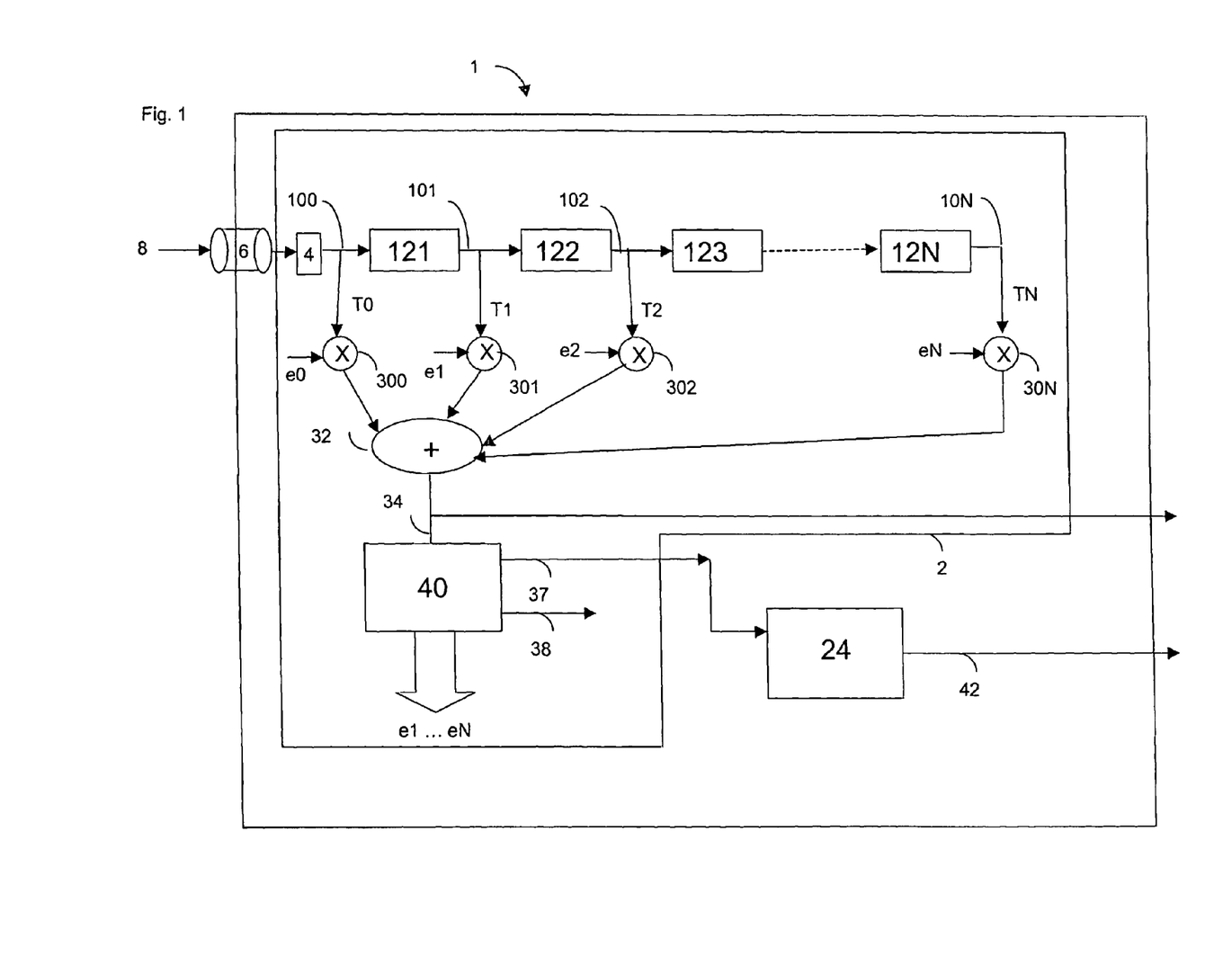
FIG. 1 is a schematic illustration of an electronic dispersion compensation circuit according to one embodiment of the present invention.

Referring now to FIG. 1, which shows a test system 1 for receiving and testing an input optical signal received from an optical fibre 6. the test system comprises an electronic dispersion compensator 2 and a signal distortion analyser 24. The electronic dispersion compensator 2 has a photoreceiver input (I/P) 4 for receiving optical radiation 8 from the fibre 6. The optical radiation 8 is modulated to carry an optical signal. The input 4 is conventional, and so will not be described or illustrated in detail, but includes a photodetector and associated amplification circuitry for converting the optical radiation into an electrical signal 100. The electrical signal 100 in this example includes non-random distortion, for example inter-symbol interference.

The test system 1 includes at least one delay line 121 to 12N arranged to delay the electrical signal 100, at least two taps T0 to TN from the delay lines 121-12N by which access is had to delayed electrical signals 101-10N and optionally also to the un-delayed signal 100.

The un-delayed signal 100 may be an analogue signal, or if a analogue-to-digital (A/D) converter is included in the receiver input 4, a digital signal. In the former case, the delay lines 121-12N are analogue delay lines, and in the latter case, digital delay lines.

The electronic dispersion compensator 2 includes an equalisation coefficient generator 40, which generates equalisation signals e0 to eN. The signals 100-10N at the taps T0-TN are each provided to corresponding multipliers 300 to 30N.

Each multiplier 300-30N multiplies the corresponding signal 100-10N by the equaliser coefficient e0 to eN, with the results being summed by a summer 32. The output 34 from the summer 32 is then an equalised output signal 34 with reduced distortion as compared with the original input electrical signal 100.

In the embodiment of the invention shown in FIG. 1, an output signal is from the equalisation coefficient generator is connected to a signal distortion analyser 24, which together with the electronic dispersion compensator 2 forms the test system 1. In other embodiments to be described later, other equalisation coefficient generator output signals are connected to the signal distortion analyser.

In some embodiments of the invention, the signal distortion analyser may be incorporated in an otherwise conventional personal computer (not shown), for example by means of an expansion card having suitable inputs and controlling data analysis software.

Various techniques used by the signal distortion analyser 24 will now be described.

Figure 2:
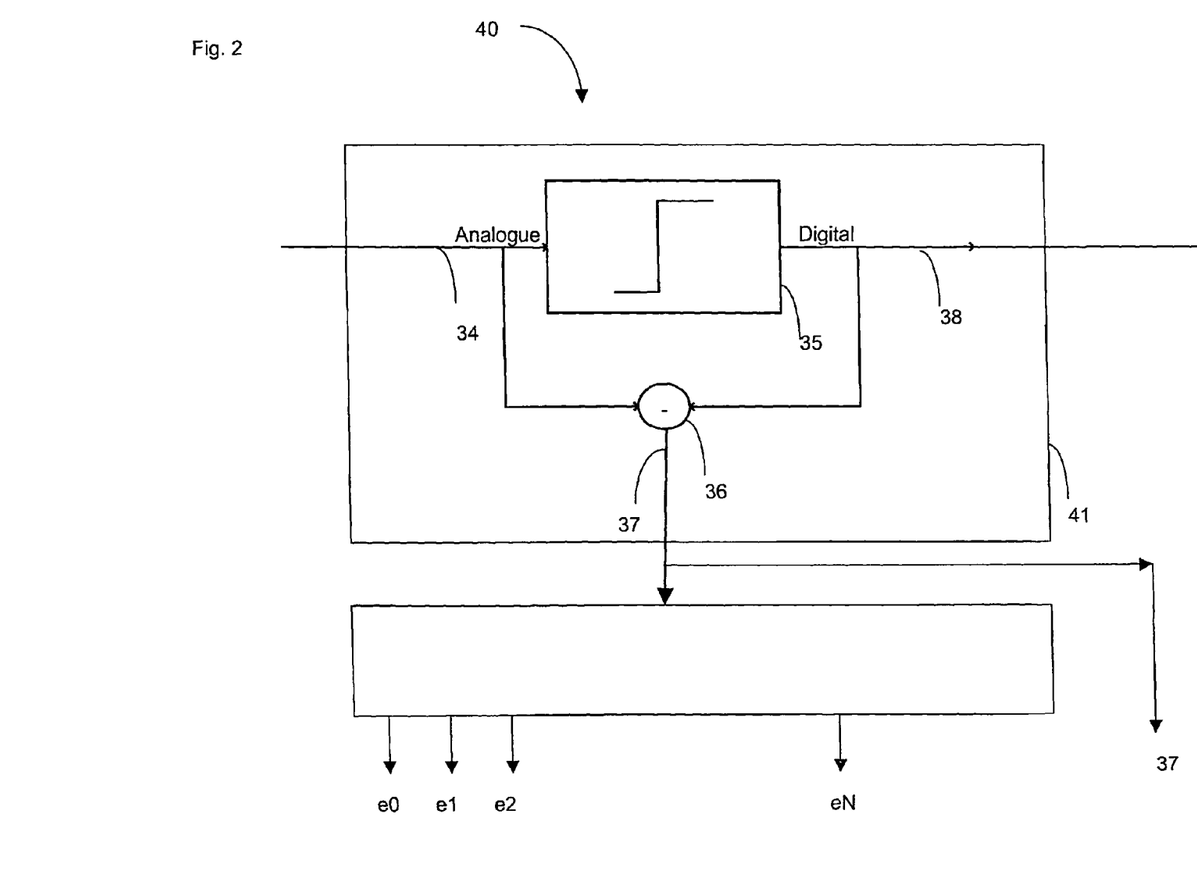
FIG. 2 is an illustration of a signal distortion analyser used by the embodiment of the invention illustrated in FIG. 1.

Referring now to FIG. 2, equalisation coefficients e0 to eN are generated by the equalisation coefficient generator 40 over many iterations by use of a mean square error detector 41 which compares the analogue output signal 34 with a corresponding square wave 38 generated by a square wave generator 35. A comparator 36 generates an error signal 37 in dependence upon the difference between the two signals 34, 38. The error signal 37 is used to update the tap weights e0 . . . eN.

In this embodiment of this invention the error signal 37 is compared to a predetermined threshold by the signal distortion analyser 24. If the error signal 37 is greater than a threshold then an alarm is generated via output 42. The signal distortion analyser 24 periodically compares the error signal 37 to the predetermined threshold and generates the alarm signal 42 if the predetermined threshold is exceeded.

Figure 3:
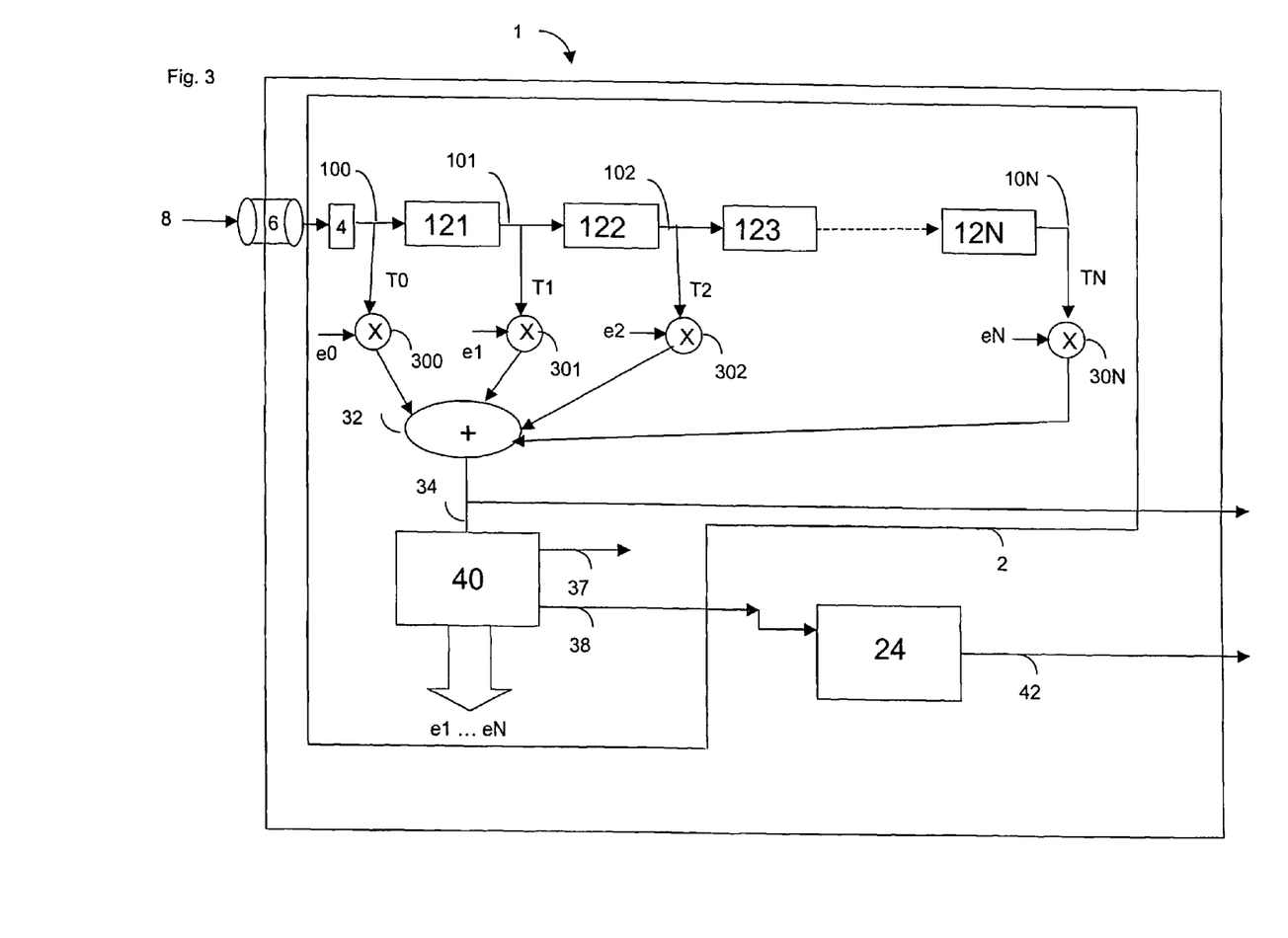
FIG. 3 is a schematic illustration of an electronic dispersion compensation circuit according to a second embodiment of the present invention.

In another embodiment of the invention illustrated in FIG. 3, the signal 38 is used by a signal distortion analyser 24'.

An eye diagram is formed by sampling windows of a signal and superimposing them upon one another. A so called 'eye' diagram, shown schematically in FIG. 4 results. The horizontal closure of the 'eye' is due to timing differences between transitions. Vertical closure of the 'eye' is caused by noise.

Figure 4:
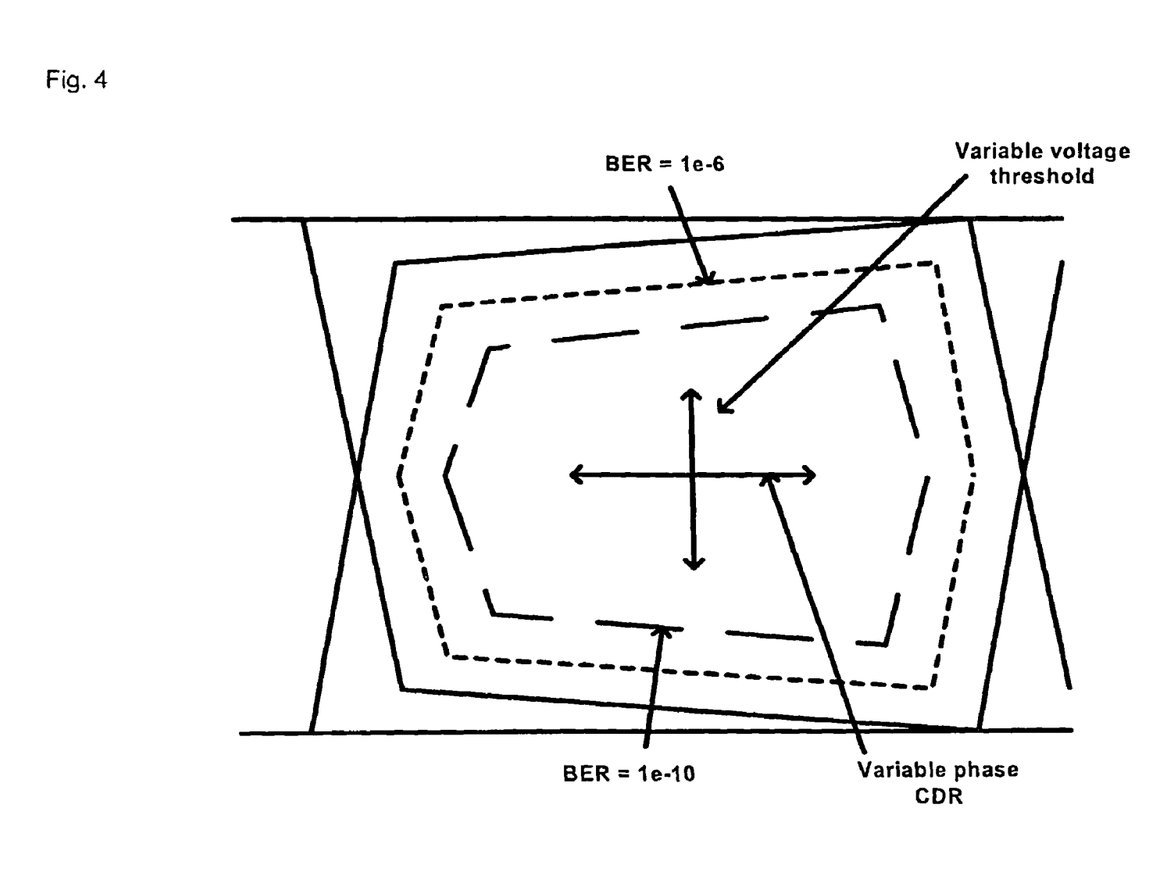
FIG. 4 is an illustration of an eye diagram.

The closure/opening of the eye diagram is determined by using a decision circuit comprising a limiting amplifier with a variable voltage threshold and a clock data recovery circuit with a variable phase delay. The bit error rate is measured by a bit error determiner using a plurality of voltage thresholds for the limiting amplifier together with a plurality of phase delays for the clack data recovery circuit. The opening of the eye is then estimated; the more 'open' the eye, the better the link is performing. The distortion analyser 24 generates an alarm in the event that the horizontal opening of the eye falls below one predetermined threshold or when the vertical opening of the eye falls below another predetermined threshold. The opening is determined to be when the bit error rate exceeds a predetermined bit error threshold.

Figure 5:
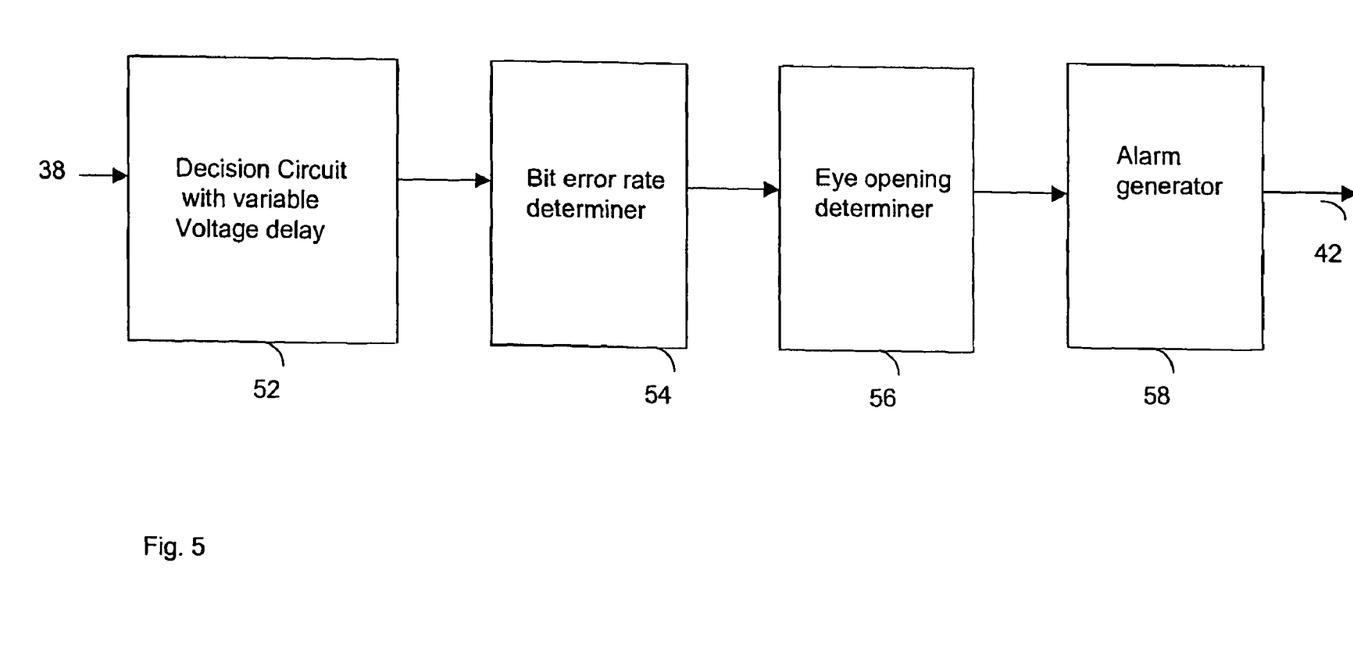
FIG. 5 is an illustration of a signal distortion analyser used by the embodiment of the invention illustrated in FIG. 3.

FIG. 5 illustrates schematically this process. A decision circuit 52 with a variable voltage threshold and a variable delay is used to sample the signal 38. A bit error determiner 54 determines the bit error rate for each voltage threshold and delay combination. The determined bit error rates are used to estimate the opening of the eye by an estimator 56. The alarm signal 42 is then generated in dependence upon the eye opening by alarm generator 58 which compares the voltage threshold at which the bit error rate exceeds a predetermined bit error threshold with a predetermined voltage threshold; compares the phase delay at which the bit error rate exceeds a predetermined bit error threshold with a predetermined phase delay threshold. If either the voltage threshold is less than the predetermined voltage threshold (indicating vertical closure) or the phase delay is less than the predetermined phase delay threshold then an alarm 42 is generated.

Figure 6:
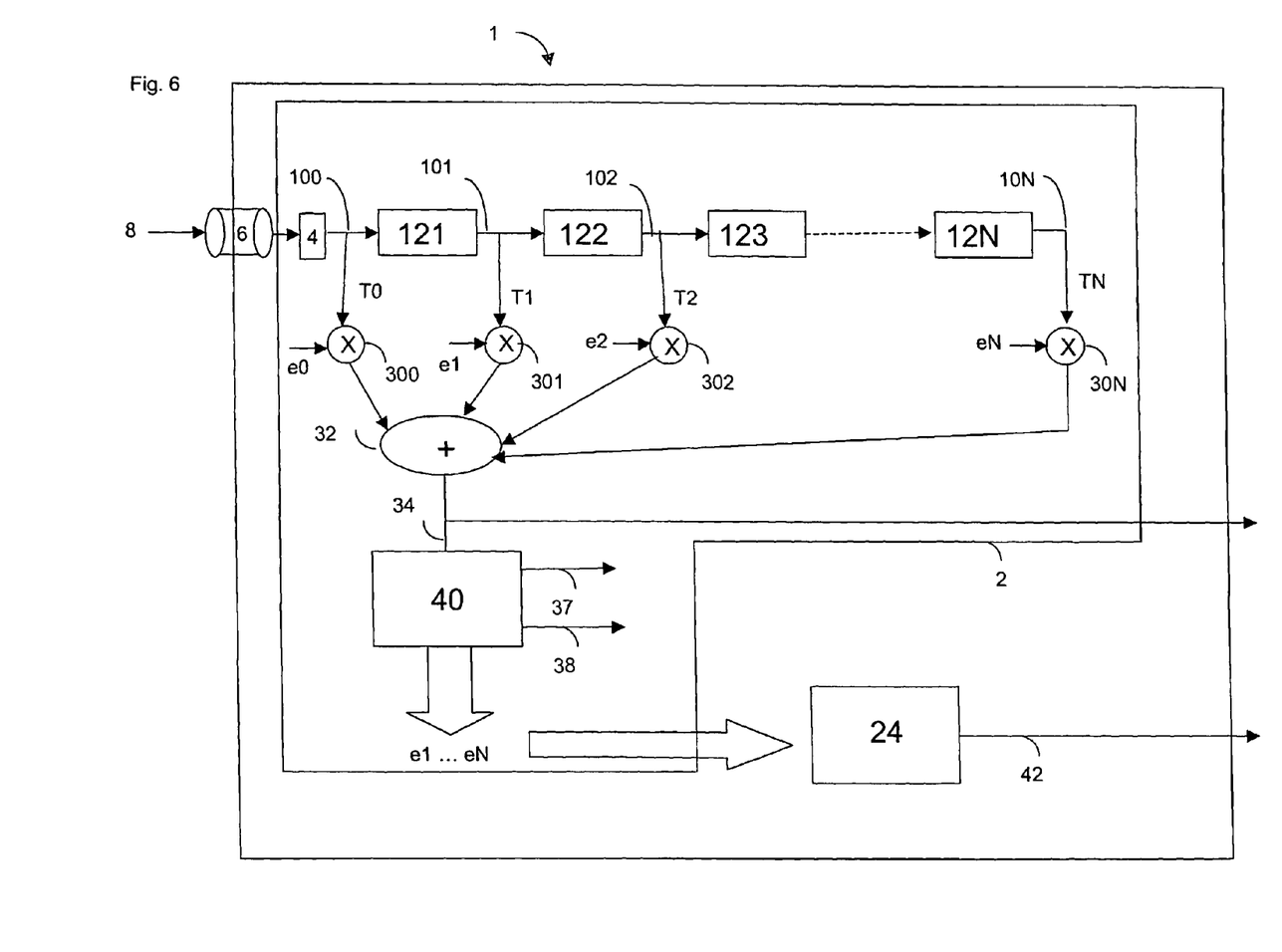
FIG. 6 is a schematic illustration of an electronic dispersion compensation circuit according to a third embodiment of the present invention.

In a third embodiment of the invention, the tap weights e0 . . . eN are used by the distortion analyser 24. In this embodiment of the invention the tap weights e0 . . . eN are used to generate an estimate of the impulse response of the link. The alarm 42 is then generated in dependence upon the estimated impulse response.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It will be appreciated that various alterations, modifications, and/or additions may be introduced into the constructions and arrangements of parts described above without departing from the scope of the present invention as defined in the following claims.

The invention claimed is:

1. A method of monitoring the performance of an electronic dispersion compensator which receives an optical signal and generates an equalised signal, in which the electronic dispersion compensatory includes an equalisation coefficient generator, the method comprising the steps of:
   receiving a signal from the equalisation coefficient generators; and
   generating an alarm in dependence upon said signal;
   wherein the equalisation coefficient generator performs the steps of
      converting the equalised signal to a digital signal; and
      comparing said digital signal to said equalised signal to provide an error signal;
   wherein the signal received from the egualisation coefficient generator is said digital signal;
   wherein the generating step comprises the sub-steps of
      sampling the output signal using a plurality of voltage thresholds wherein said sampling of the output signal uses a clock utilising a plurality of phase delays;
      determining the bit error rate for a plurality of combinations of voltage threshold and phase delay;
      determining an eye opening voltage at which the bit error rate exceeds a predetermined bit error threshold;
      determining an eye opening phase delay at which the bit error rate exceeds a predetermined bit error threshold; and
   generating the alarm when either the eye opening voltage less than a voltage predetermined threshold or the eye opening phase delay is less than a phase delay predetermined threshold.

2. A method according to claim 1, in which the equalisation coefficient generator is arranged in operation to generate a plurality of tap weights (e0 . . . eN) for use in weighting delayed portions of a received signal prior to summing said delayed portions to provide said equalised signal and in which the generating step comprises the sub-steps of:
   estimating an impulse response in dependence upon a combination of the equaliser tap weights (e0 . . . N); and
   generating the alarm in dependence upon said estimated impulse response.

3. An apparatus for monitoring the performance of an electronic dispersion compensatory which receives an optical signal and generates an equalised signal, in which the electronic dispersion compensator includes an equalisation coefficient generator, the apparatus comprising a signal distortion analyser arranged in operation to receive a signal from the equalisation coefficient generator and generate an alarm in dependence upon said signal;
   wherein the egualisation coefficient generator comprises:
      a convener for convening the egualised signal to a digital signal; and
      a comparator to compare said digital signal to said egualised signal to provide an error signal;
   wherein the signal distortion analyser comprises:
      a decision circuit arranged in operation to sample the digital signal using a plurality of voltage thresholds and to sample the digital signal using a clock utilising a plurality of phase delays;

a bit error determiners arranged in operation to determine the bit error rate for a plurality of combinations of voltage threshold and phase delay;

an eye opening determiner arranged in operation to determine an eye opening voltage at which the bit error rate exceeds a predetermined bit error threshold and to determine an eye opening phase delay at which the bit error rate exceeds a predetermined bit error threshold; and an alarm generator arranged in operation to generate an alarm when either the eye opening voltage less than a voltage predetermined threshold or the eye opening phase delay is less than a phase delay predetermined threshold.

4. An apparatus according to claim 3, in which the equalisation coefficient generator is arranged in operation to generate a plurality of tap weights (e0 . . . eN) for use in weighting delayed portions of a received signal prior to summing said delayed portions to provide said equalised signal and in which the and in which the signal distortion analyser comprises:

means for estimating an impulse response in dependence upon a combination of the equaliser tap weights (e0 . . . eN); and means for generating the alarm in dependence upon said estimated impulse response.

* * * * *

UNITED STATES PATENT AND TRADEMARK OFFICE
CERTIFICATE OF CORRECTION

| | | |
|---|---|---|
| PATENT NO. | : 7,567,760 B2 | Page 1 of 1 |
| APPLICATION NO. | : 11/477220 | |
| DATED | : July 28, 2009 | |
| INVENTOR(S) | : Andrew Bothwell et al. | |

It is certified that error appears in the above-identified patent and that said Letters Patent is hereby corrected as shown below:

Column 6, Line 25, Claim 1, delete "egualisation" and insert --equalisation--.

Column 6, Line 49, Claim 2, delete "N);" and insert --eN);--.

Column 6, Line 60, Claim 3, delete "egualisation" and insert --equalisation--.

Column 6, Line 61, Claim 3, delete "convener" and insert --converter--.

Column 6, Line 61, Claim 3, delete "convening" and insert --converting--.

Column 6, Line 61, Claim 3, delete "egualised" and insert --equalised--.

Column 6, Lines 63-64, Claim 3, delete "egualised" and insert --equalised--.

Column 8, Line 7, Claim 4, after "the" delete "and in which the".

Signed and Sealed this
Second Day of October, 2012

David J. Kappos
*Director of the United States Patent and Trademark Office*